(12) United States Patent
Sharma

(10) Patent No.: US 8,940,396 B1
(45) Date of Patent: Jan. 27, 2015

(54) GRAPHENE COATING FOR GLASS CONTAINERS

(71) Applicant: Owens-Brockway Glass Container Inc., Perrysburg, OH (US)

(72) Inventor: Pramod K. Sharma, Ann Arbor, MI (US)

(*) Notice: Subject to any disclaimer, the term of this patent is extended or adjusted under 35 U.S.C. 154(b) by 0 days.

(21) Appl. No.: 14/047,577

(22) Filed: Oct. 7, 2013

(51) Int. Cl.
*B23B 9/00* (2006.01)
*B65D 25/34* (2006.01)
*B05D 3/02* (2006.01)
*B05D 3/06* (2006.01)

(52) U.S. Cl.
CPC .............. *B65D 25/34* (2013.01); *B05D 3/0254* (2013.01); *B05D 3/067* (2013.01)
USPC .......... 428/408; 428/704; 428/34.4; 428/447; 427/331; 427/249.1

(58) Field of Classification Search
USPC ................ 428/408, 704, 34.4, 447; 427/331, 427/249.1
See application file for complete search history.

(56) References Cited

U.S. PATENT DOCUMENTS

| 2011/0049437 | A1 | 3/2011 | Crain et al. |
| 2011/0123776 | A1 | 5/2011 | Shin et al. |
| 2012/0277360 | A1 | 11/2012 | Scheffer et al. |

FOREIGN PATENT DOCUMENTS

CN 102424532 4/2012

*Primary Examiner* — Michael C Miggins

(57) ABSTRACT

A glass container and a process for forming a graphene-containing coating on an exterior surface of the glass container to increase the strength of the glass container. A liquid coating composition that includes a physical mixture of a graphene material and a siloxane polymer is applied to the exterior surface of the glass container to form a precursor coating thereon. The glass container and the precursor coating are then cured to form a composite thin film of silica ($SiO_2$) and graphene on the exterior surface of the glass container.

17 Claims, 2 Drawing Sheets

… … …

GRAPHENE COATING FOR GLASS CONTAINERS

The present disclosure is directed to glass containers, and, more particularly, to coatings for glass containers, e.g., glass bottles and jars.

BACKGROUND AND SUMMARY OF THE DISCLOSURE

Glass containers may be coated for a variety of different purposes, including damage prevention, e.g., scratch and abrasion resistance, and strength retention. Such coatings may be applied to the glass containers at various points in the manufacturing process. For example, glass containers are conventionally coated with metal oxides, e.g., oxides of tin, titanium, vanadium, or zirconium, at the "hot end" of the annealing lehr, and then overcoated with protective organic coatings, e.g., polyurethane or polypropylene, at the "cold end" of the annealing lehr. Accordingly, these conventional coatings may be referred to as cold or hot end coatings. U.S. Patents that illustrate coating processes of this type include U.S. Pat. Nos. 3,323,889; 3,407,085; 3,414,429; 3,418,154; 3,425,859; 3,445,269; 3,498,825; 3,554,787; and 3,598,632.

A general object of the present disclosure, in accordance with one aspect of the disclosure, is to provide a process for coating glass containers that can improve the strength of the glass containers.

The present disclosure embodies a number of aspects that can be implemented separately from or in combination with each other.

A process for forming a graphene coating on a glass container, in accordance with one aspect of the disclosure, includes: (a) applying a graphene coating composition in liquid phase to an exterior surface of the glass container to form a precursor coating thereon; and (b) curing the precursor coating to form a composite thin film of silica and graphene on the exterior surface of the glass container. The graphene coating composition includes a physical mixture of a graphene material and a siloxane polymer, but does not include a non-silane organic monomer or polymer.

In accordance with another aspect of the disclosure, there is provided a glass container that includes: a glass substrate that defines the shape of the container and provides the container with a closed base at an axial end of the container, a body extending axially from the base and being circumferentially closed, and an open mouth at another axial end of the glass container opposite the base; and a graphene coating formed on an exterior surface of the glass substrate. The graphene coating is a composite that includes a dispersed phase of graphene and a matrix phase of silica ($SiO_2$) and is bonded to the exterior surface of the glass container through a plurality of siloxane bonds.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1:
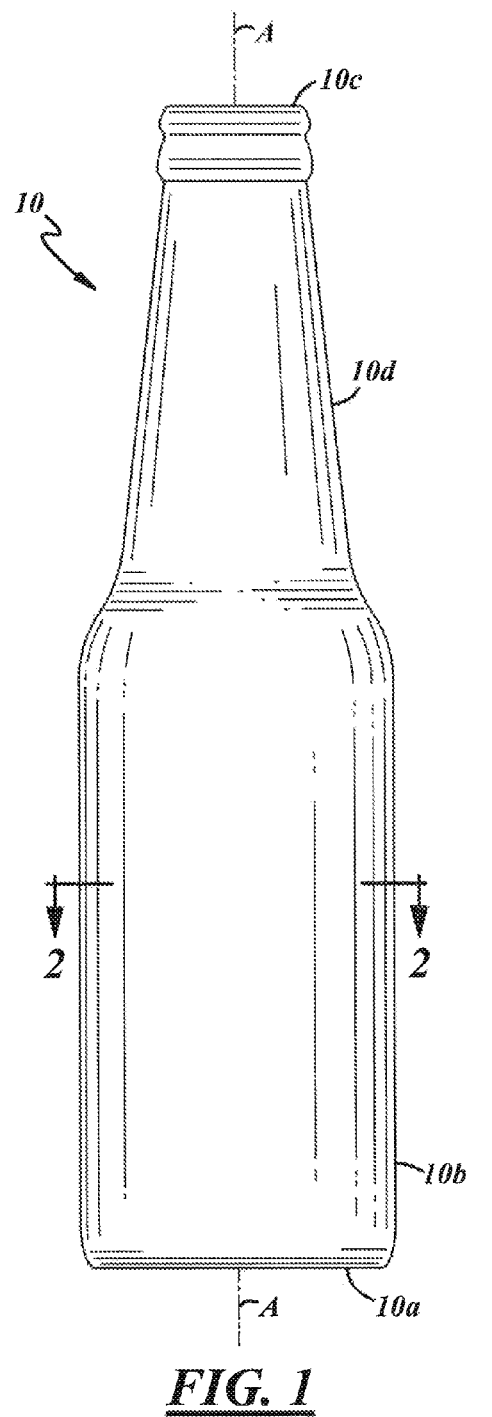
FIG. 1 is a side elevation view of a glass container, in accordance with one illustrative embodiment of the present disclosure.

FIG. 1 illustrates a glass container 10 that may be produced in accordance with one embodiment of the present disclosure. The glass container 10 includes a longitudinal axis A, a closed base 10a at one axial end of the container 10, a body 10b extending in an axial direction from the closed base 10a, and an open mouth 10c at another axial end of the container 10 opposite of the base 10a. Accordingly, the glass container 10 is hollow. In the illustrated embodiment, the container 10 also includes a neck 10d that may extend axially from the body 10b, may be generally conical in shape, and may terminate in the mouth 10c. However, the container 10 need not include the neck 10d and the mouth 10c may terminate the body 10b, such as in a glass jar embodiment or the like. The body 10b may be of any suitable shape in cross-section transverse to the axis A as long as the body 10b is circumferentially closed.

Figure 2:
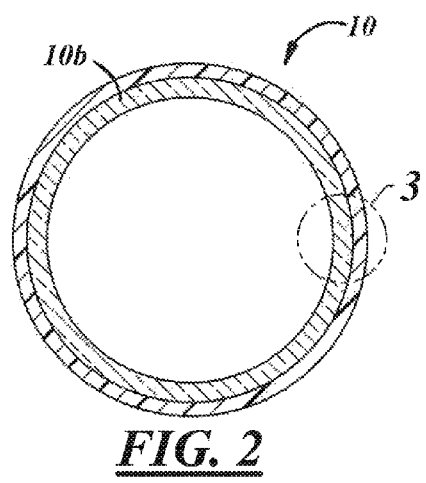
FIG. 2 is a cross-sectional view of a body portion of the glass container, taken along line 2-2 of FIG. 1.

As illustrated in FIG. 2, the body 10b may be of cylindrical transverse cross-sectional shape that is circumferentially closed. In other embodiments, the body 10b may be generally oval, square, rectangular, or of any other suitable transverse cross-sectional shape. As used herein, the term "circumferentially" applies not only to circular or cylindrical transverse cross-sectional shapes but also applies to any transverse cross-sectional shape.

Figure 3:
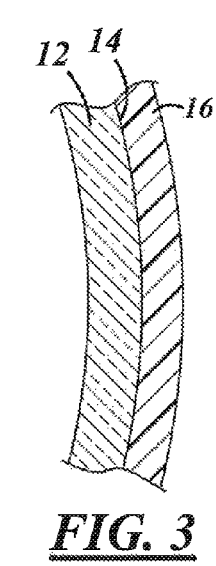
FIG. 3 is an enlarged sectional view of the body portion of the glass container, taken from circle 3 of FIG. 2.

Referring now to FIG. 3, the container 10 includes a glass substrate 12 having at least one coating layer formed on an exterior surface 14 thereof. In the embodiment illustrated in FIG. 3, a graphene coating 16 is formed on the glass substrate 12. The glass substrate 12 may have a thickness in the range of 1-5 mm, and the graphene coating 16 may have a thickness in the range of 100 nm to 200 nm, including all ranges and subranges between these ranges.

The graphene coating 16 may be formed directly on the substrate 12, or the graphene coating 16 may be formed on the exterior surface 14 of the glass substrate 12 over one or more different coatings already present on the glass substrate 12. For example, in some embodiments, the graphene coating 16 may be formed directly on the exterior surface 14 of the glass substrate 12 after formation of the substrate 12, but before the substrate 12 has been annealed. In such case, the graphene coating 16 may eliminate the need for a conventional hot end coating.

In other embodiments, the graphene coating 16 may be formed on the exterior surface 14 of the glass substrate 12 over a conventional hot end coating. "Hot end" coatings are coatings that are conventionally applied to glass containers before the containers are annealed. One or more "cold end" coatings also are conventionally applied to the glass containers after annealing over the hot end coatings. Therefore, in embodiments where the graphene coating 16 is formed on the glass substrate 12 over a conventional hot end coating, the graphene coating 16 may suitably be formed on the glass substrate 12 after the substrate 12 has been annealed. In such case, the graphene coating 16 may eliminate the need for one or more other cold end coatings.

In another embodiment, the graphene coating 16 may be formed on the exterior surface 14 of the glass substrate 12 over one or more conventional cold end coatings.

One or more additional coating layers also may be formed over the graphene coating 16 on the exterior surface 14 of the glass substrate 12. For example, a conventional cold end coating may be formed on the exterior surface 14 of the glass substrate 12 over the graphene coating 16 anytime after the glass substrate 12 has been annealed.

If the container 10 includes one or more different coatings overlying and/or underneath the graphene coating 16 on exterior surface 14 of the glass substrate 12, the various coatings may be formed as adjacent layers overlying one another sequentially, or one or more of the coatings may penetrate into or even through one or more of the other coatings. Accordingly, the various coatings may be fairly described as being formed generally "on" or "over" the glass substrate 12, regardless of how or to what extent any given coating contacts any of the other coatings and/or the substrate 12 itself. Similarly, when a material is described as being applied generally to the glass container 10, the material may be applied directly to the glass substrate 12, or the material may be applied to the glass substrate 12 over one or more coatings already present on the glass substrate 12.

The graphene coating 16 is a composite that includes a dispersed phase of graphene and a matrix phase of silica ($SiO_2$). The graphene may be uniformly dispersed throughout the silica matrix and may be in the form of graphene flakes, sheets, or platelets that have not been oxidized or reduced. The graphene flakes, sheets, or platelets may include a single layer of graphene, or they may include two or more layers of stacked graphene. The graphene coating 16 may be bonded to the glass substrate 12, or to an intermediate coating layer already present on the glass substrate 12, through a plurality of siloxane bonds. The graphene coating 16 may be considered "monolithic," in that the coating 16 may have a generally consistent composition through its thickness.

The graphene coating 16 can be used to increase the strength of the glass container 10 when the graphene coating 16 is formed directly on the exterior surface 14 of the glass substrate 12, or when the graphene coating 16 is formed over one or more different coatings already present on the glass substrate 12.

Although the graphene coating 16 may increase the electrical conductivity of the glass container 10, the graphene coating 16 is not specifically formulated for this purpose. Accordingly, the graphene coating 16 preferably does not include any materials, other than graphene, that have an electrical conductivity at 25° C. of greater than one siemens per centimeter (S/cm). For example, the graphene coating 16 preferably does not include any electrically conductive metals (e.g., silver, copper, aluminum, platinum, palladium, nickel, chromium, gold, or bronze), electrically conductive metal oxides (e.g., antimony tin oxide or indium tin oxide), or electrically conductive polymers or copolymers (e.g., polyacetylene, polyethylene dioxythiophene, polystyrenesulfonate, polythiophene or polythiophenes, polyphenylenevinylene, polypyrene, polycarbazole, polyazulene, polyazepine, polyfluororenes, polynaphthalene, polyisonaphthalene, polyaniline, polypyrrole, or polyphenylene sulfide).

The glass container 10 may be produced in any suitable manner. A typical glass container manufacturing process includes a "hot end," where molten glass is prepared and formed into the shape of a glass container, and a "cold end," where the glass container is inspected, and packaged. After the glass container is formed, but before it is inspected and packaged, the glass container is annealed, for example, in an annealing lehr.

The graphene coating 16 may be formed on the glass substrate 12 using a wet chemical deposition process. This process may include: (1) preparing a graphene coating composition, (2) applying the graphene coating composition to the glass container 10 to form a precursor coating on the glass container 10, and then (3) curing the precursor coating to convert the precursor coating into a composite thin film of silica and graphene.

The graphene coating composition may be prepared from a physical mixture of a graphene material and a siloxane polymer. The siloxane polymer is formulated to sufficiently adhere the graphene coating 16 to the glass container 10, and also may be formulated to provide the coating 16 with mechanical durability and strength, as well as chemical resistance.

The graphene coating composition is preferably prepared without the use of any polymerizable non-silane organic compounds. The term "non-silane organic compound" includes any organic monomer or polymer that is not considered to be a silane due to the absence of a silicon atom that supports one or more functional groups. Non-silane monomers and polymers that include an acetal, acryl, alkene, amide, amine, epoxide, ester, imine, phenol, or urethane functional group are a few particular polymerizable non-silane organic compounds that are preferably excluded from the graphene coating composition.

The graphene material used to prepare the graphene coating composition may be obtained from a commercially available graphene solution, which may include complexes of graphene and one or more ionic surfactants, e.g., sodium cholate. One specific example of a commercially available source of graphene is PureSheets™, which is manufactured by NanoIntegris and includes 0.05 mg/mL of pristine graphene nanoplatelets.

The siloxane polymer may include a network of siloxane polymers and may be prepared by dissolving or dispersing one or more silane compounds in a solvent to form a silane solution, and stirring the silane solution for a suitable amount of time for hydrolysis and polycondensation reactions to take place within the solution. Thereafter, the as-prepared siloxane polymer is separated from the solvent and mixed with the graphene material at a sufficient temperature to form a liquid phase coating composition.

The one or more silanes used to prepare the siloxane polymer may be represented by the following chemical formula: $Y_n SiX_{4-n}$, where n=0, 1, 2. The Y group may be a non-reactive group, e.g., an alkyl or phenyl group, or a reactive group, e.g., an epoxy group. The X group is a hydrolyzable group, e.g., a methoxy or ethoxy group. Some specific examples of alkoxysilanes that may be used individually or in combination with one another to form a siloxane polymer or a network of siloxane polymers include: phenyltriethoxysilane, diphenyldiethoxysilane, tetraethoxysilane, 3-glycidoxypropyltrimethoxysilane, and 3-glycidoxypropyltriethoxysilane.

The siloxane polymer may account for about 40 wt. % of the graphene coating composition, and the graphene material may account for about 5 wt. % of the graphene coating composition. For example, the siloxane polymer may account for between 10 wt. % and 50 wt. % of the graphene coating composition, and the graphene material may account for between 1 wt. % and 10 wt. % of the graphene coating composition, including all ranges and subranges between those ranges.

The solvent used to prepare the silane solution may include water, alcohol, ether, or a mixture thereof. Some examples of suitable alcohols that may be used as the solvent or combined with water to form a suitable solvent include ethanol, methanol, isopropanol, butanol (e.g., tert-butanol), and glycol (e.g., ethylene glycol).

Formation of the siloxane polymer may include introducing a catalyst, e.g., an acid or a base, into the silane solution while it is being stirred to help speed up the hydrolysis and polycondensation reactions therein. Some examples of suitable acids and bases that may be added to the silane solution include: hydrochloric acid (HCl), acetic acid ($CH_3COOH$), hydrogen fluoride (HF), sulfuric acid ($H_2SO_4$), and ammonium hydroxide ($NH_4OH$).

The graphene coating composition may be applied to the glass container 10 before, during, or after the glass container is annealed. If the graphene coating composition is applied to the glass container 10 before annealing, the glass container 10 may be at a temperature in the range of 200 degrees Celsius to 800 degrees Celsius during the application process, including all ranges and subranges therebetween. If the graphene coating composition is applied after annealing, the glass container 10 may be at a temperature in the range of 50 degrees Celsius to 250 degrees Celsius when the graphene coating composition is applied thereto, including all ranges and subranges therebetween.

The graphene coating composition may be applied to the exterior surface 14 of the glass substrate 12 without having to first pre-treat the substrate 12. For example, the graphene coating composition may be applied to the exterior surface 14 of the glass substrate 12 without having to first attach a functional group, e.g., an amino group, to the exterior surface 14 of the substrate 12.

The graphene coating composition may be applied to the glass container 10 by any suitable wet chemical coating method. For example, the graphene coating composition may be applied to the glass container 10 by spraying, dipping, brushing, roller coating, spin or flow coating, to name a few.

Accordingly, the temperature of the graphene coating composition may need to be adjusted before the application process so that the graphene coating composition exhibits a suitable viscosity for deposition, e.g., about 5 cP to 100 cP, including all ranges and subranges therebetween. This may include heating or cooling the graphene coating composition to room temperature or to a temperature slightly above room temperature before the coating composition is applied to the glass container 10. More specifically, the graphene coating composition may be heated or cooled before it is applied to the glass container 10 to a temperature in the range of 20 degrees Celsius to 95 degrees Celsius, including all ranges and subranges therebetween.

The precursor coating is then cured to form a composite thin film of silica ($SiO_2$) and graphene on the glass container 10. This step may include heating the glass container 10 and the precursor coating at a temperature of about 150 degrees Celsius for about 2 hours. For example, the glass container 10 and the precursor coating may be heated at a temperature in the range of 100 degrees Celsius to 180 degrees Celsius, including all ranges and subranges therebetween, to cure the precursor coating.

However, when a heat treatment process is used to cure the precursor coating, such process is preferably performed at a temperature that is below the calcination temperature of the precursor coating. For example, this may include curing the precursor coating at a temperature that is below 300 degrees Celsius.

In some embodiments, the precursor coating may be cured by being exposed to electromagnetic radiation. This may include exposing the precursor coating to ultraviolet (UV) radiation having a wavelength in the range of 10 nm to 400 nm. If UV radiation is used to cure the precursor coating, the graphene coating composition used to form the precursor coating may include an initiator. One specific example of an initiator that may be added to the graphene coating composition of the present disclosure is IRGACURE® 819.

EXAMPLES

Several 2"×2" soda-lime-silica glass substrates having thicknesses of 3.2 mm were washed with soap and water, wiped with isopropyl alcohol, and then dried. Thereafter, an indentation was formed in each of the glass substrates using a Vickers harness instrument at 200 gf for 30 seconds. Some of the as-prepared glass substrates were then coated with a silane coating composition, and others were coated with a graphene coating composition. The remaining glass substrates were left uncoated for purposes of comparison.

Figure 4:
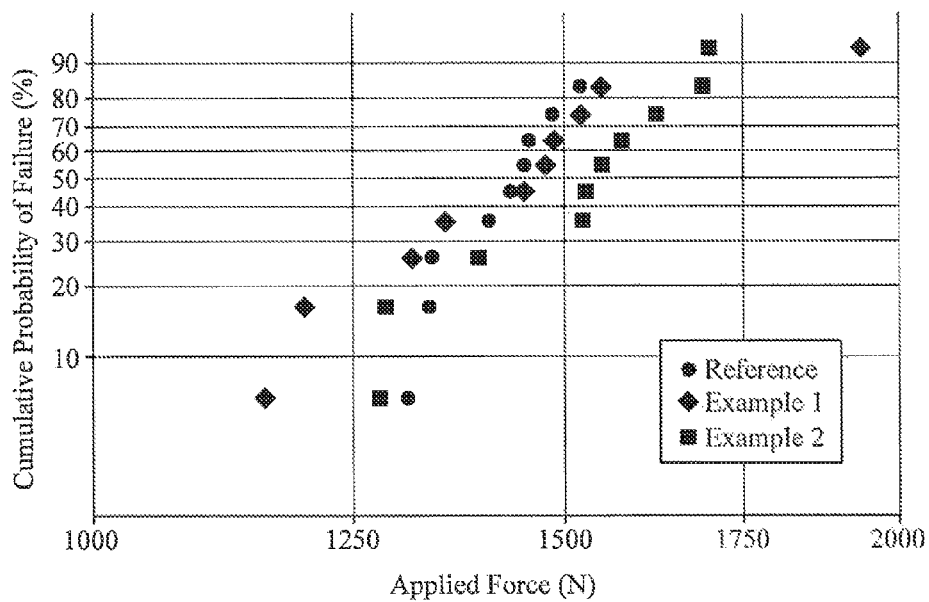
FIG. 4 illustrates Weibull plots of cumulative probability of failure (%) vs. applied force (N) for an uncoated glass substrate (labeled as Reference), a silane-coated glass substrate (labeled as Example 1), and a silane and graphene-coated glass substrate (labeled as Example 2).

The strength of the coated and uncoated glass substrates was assessed by performing ring-on-ring tests using an electromechanical Universal Testing Machine AGS-X-5kN by Shimadzu. The results of such tests are shown in FIG. 4, which illustrates Weibull plots of cumulative failure probability (%) vs. applied force (N) for an uncoated glass substrate (labeled as Reference), a silane-coated glass substrate (labeled as Example 1), and a graphene-coated glass substrate (labeled as Example 2).

Example 1

In this example, a silane coating composition was prepared and used to coat several glass substrates.

The silane coating composition was prepared from a mixture of three different solutions: A, B, and C. Solution A was prepared from a mixture of 8.1 mL of water, 13.84 g of ethanol, and 0.15 gm of a 37.1 wt. % hydrochloric acid solution; Solution B was prepared from a mixture of 27.04 g of phenyltriethoxysilane and 13.79 g of methanol; and Solution C was prepared from a mixture of 7.64 g of diphenyldiethoxysilane and 9.21 g of denatured ethanol. The ingredients used to prepare Solutions A, B, and C were separately combined, and then mixed for 15 minutes.

First, Solution B was slowly added to Solution A with continuous stirring, covered, and stirred for another 3 hours. Solution C was then added drop wise to the first mixture, covered, and stirred for another 2 hours. After 2 hours of stirring, 2.78 µL of a 30 wt. % ammonium hydroxide solution was added to the mixture of Solutions A, B, and C, covered, and stirred for another hour. Thereafter, the mixture was uncovered and stirred for another 48 hours to form a viscous gel, which was dried overnight at 70° C. 10 mL of pure acetone was then added to the dried gel, which was stirred for 2 hours, filtered using a Buchner funnel, and stirred for another 5-7 hours to evaporate the acetone. Thereafter, the gel was heated at a temperature of 70° C. for 24 hours, and then heated at a temperature of 110° C. for another 24 hours to form the final silane coating composition.

The silane coating composition was heated to a temperature of about 70° C., applied to the glass substrates, and then cured at 170° C. for 2 hours. Thereafter, ring on ring testing was performed to determine the fracture strength of silane-coated glass substrates.

Example 2

In this example, the silane coating composition of Example 1 was mixed with a graphene material to form a graphene coating composition.

The graphene material was prepared using 5 g of a commercially available aqueous graphene solution that was manufactured by NanoIntegris and included 0.05 mg/mL of pristine graphene nanoplatelets having an average flake area of ~10,000 nm$^2$ and 0.02 g/mL of a proprietary ionic surfactant. The graphene solution was heated at 150° C. to evaporate the solvent and then mixed with 9 g of the silane coating composition of Example 1 at a temperature of 70° C. to form the graphene coating composition.

The graphene coating composition was applied to the glass substrates at a temperature of 70° C., and then cured at 170° C. for 2 hours to form an exemplary graphene coating. Thereafter, ring on ring testing was performed to determine the fracture strength of graphene-coated glass substrates.

As illustrated in FIG. 4, the fracture strength of the graphene-coated glass substrates was greater than that of the uncoated glass substrates, and also greater than that of the glass substrates that were coated with the silane coating composition alone.

There thus has been disclosed a process for coating glass containers that can improve certain desirable surface characteristics of the glass containers, and thus fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A process for forming a graphene coating on a glass container that includes:
   (a) applying a graphene coating composition in liquid phase to an exterior surface of the glass container to form a precursor coating thereon, wherein the graphene coating composition includes a physical mixture of a graphene material and a siloxane polymer, but does not include a non-silane organic monomer or polymer; and
   (b) curing the precursor coating to form a composite thin film of silica and graphene on the exterior surface of the glass container.

2. The process set forth in claim 1 wherein the graphene material includes a complex of graphene and an ionic surfactant.

3. The process set forth in claim 1 wherein the graphene material is present in the graphene coating composition in an amount constituting between 1 percent and 10 percent by weight of the graphene coating composition.

4. The process set forth in claim 1 wherein the graphene coating composition further includes an initiator.

5. The process set forth in claim 1 that also includes:
   before said step (a), heating the graphene coating composition to a temperature in the range of 20 degrees Celsius to 95 degrees Celsius.

6. The process set forth in claim 1 wherein said step (b) includes heating the glass container and the precursor coating at a temperature in the range of 100 degrees Celsius to 180 degrees Celsius.

7. The process set forth in claim 1 wherein said step (b) includes exposing the precursor coating to ultraviolet (UV) radiation having a wavelength in the range of 10 nm to 400 nm.

8. The process set forth in claim 1 wherein the siloxane polymer is prepared by dissolving or dispersing a plurality of alkoxysilanes in a solvent to form a silane solution, stirring the silane solution for a sufficient amount of time to crosslink at least some of the alkoxysilanes with one another, and then separating the crosslinked alkoxysilanes from the solvent.

9. The process set forth in claim 8 wherein the plurality of alkoxysilanes are represented by the following chemical formula: $Y_nSiX_{4-n}$, wherein:
   n=0, 1, 2,
   Y represents an alkyl, phenyl, or epoxy group, and
   X represents a methoxy or ethoxy group.

10. The process set forth in claim 8 wherein the plurality of alkoxysilanes include: phenyltriethoxysilane, diphenyldiethoxysilane, tetraethoxysilane, 3-glycidoxypropyltrimethoxysilane, 3-glycidoxypropyltriethoxysilane, or a combination thereof.

11. The process set forth in claim 8 wherein the solvent includes water, alcohol, ether, or a mixture thereof.

12. The process set forth in claim 1 wherein the graphene coating composition has a viscosity in the range of 5 cP to 100 cP.

13. The process set forth in claim 12 wherein the siloxane polymer is present in the graphene coating composition in an amount constituting between 10 percent and 50 percent by weight of the graphene coating composition.

14. A glass container that includes:
   a glass substrate that defines the shape of said container and provides said container with a closed base at an axial end of said container, a body extending axially from said base and being circumferentially closed, and an open mouth at another axial end of said glass container opposite said base; and
   a graphene coating formed on an exterior surface of said glass substrate, wherein the graphene coating is a composite that includes a dispersed phase of graphene and a matrix phase of silica ($SiO_2$) and is bonded to the exterior surface of the glass container through a plurality of siloxane bonds.

15. The glass container set forth in claim 14 wherein the graphene coating has a thickness in the range of 100 nm to 200 nm.

16. The glass container set forth in claim 14 wherein the graphene coating does not include a metal, a metal oxide, a polymer, or a copolymer having an electrical conductivity at 25° C. of greater than one siemens per centimeter (S/cm).

17. The glass container set forth in claim 14 wherein the graphene coating is derived from a graphene coating composition that includes a physical mixture of a graphene material and a siloxane polymer, but does not include a non-silane organic monomer or polymer.

* * * * *